US009646054B2

(12) United States Patent
Nezhad et al.

(10) Patent No.: US 9,646,054 B2
(45) Date of Patent: May 9, 2017

(54) MATCHING OF CASES BASED ON ATTRIBUTES INCLUDING AN ATTRIBUTE RELATING TO FLOW OF ACTIVITIES

(75) Inventors: Hamid Reza Motahari Nezhad, Los Altos, CA (US); Claudio Bartolini, Palo Alto, CA (US); Parag M. Joshi, Los Gatos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1198 days.

(21) Appl. No.: 13/238,430

(22) Filed: Sep. 21, 2011

(65) Prior Publication Data

US 2013/0073557 A1 Mar. 21, 2013

(51) Int. Cl.
*G06F 17/30* (2006.01)

(52) U.S. Cl.
CPC .... *G06F 17/30522* (2013.01); *G06F 17/3053* (2013.01); *G06F 17/30598* (2013.01); *G06F 17/30604* (2013.01)

(58) Field of Classification Search
CPC ......... G06F 17/30522; G06F 17/30598; G06F 17/3053; G06F 17/30604
See application file for complete search history.

(56) References Cited

U.S. PATENT DOCUMENTS

| | | | |
|---|---|---|---|
| 5,978,785 A * | 11/1999 | Johnson et al. | 706/54 |
| 6,081,798 A * | 6/2000 | Johnson et al. | 706/54 |
| 6,535,865 B1 * | 3/2003 | Skaaning et al. | 706/52 |
| 6,571,236 B1 * | 5/2003 | Ruppelt | 714/25 |
| 6,594,636 B1 * | 7/2003 | Sakaguchi et al. | 705/7.11 |
| 6,820,072 B1 * | 11/2004 | Skaanning et al. | 706/52 |
| 6,879,973 B2 * | 4/2005 | Skaanning et al. | 706/52 |
| 7,107,339 B1 | 9/2006 | Wolters | |
| 7,343,406 B1 * | 3/2008 | Buonanno et al. | 709/224 |
| 7,447,713 B1 * | 11/2008 | Berkheimer | |
| 7,496,660 B2 * | 2/2009 | Blaisdell et al. | 709/224 |
| 7,657,627 B2 | 2/2010 | Grabarnik | |
| 7,962,432 B2 * | 6/2011 | Timmins et al. | 706/46 |
| 8,775,202 B2 * | 7/2014 | Hanf et al. | 705/2 |
| 8,799,006 B2 * | 8/2014 | Hanf et al. | 705/2 |
| 2003/0195781 A1 * | 10/2003 | Sakaguchi et al. | 705/7 |
| 2003/0195782 A1 * | 10/2003 | Sakaguchi et al. | 705/7 |
| 2004/0024721 A1 * | 2/2004 | Wilfrid Donovan et al. | 706/46 |
| 2010/0094590 A1 | 4/2010 | Ozonat | |
| 2011/0106801 A1 * | 5/2011 | Srivastava et al. | 707/737 |
| 2011/0126275 A1 * | 5/2011 | Anderson et al. | 726/8 |
| 2012/0166246 A1 * | 6/2012 | Simon | 705/7.26 |
| 2014/0164051 A1 * | 6/2014 | Nezhad et al. | 705/7.27 |

OTHER PUBLICATIONS

Minor et. al., Towards Case-Based Adaptation of Workflows, Jul. 2010 (15 pages).

(Continued)

*Primary Examiner* — James Trujillo
*Assistant Examiner* — Hubert Cheung
(74) *Attorney, Agent, or Firm* — Trop, Pruner & Hu, P.C.

(57) ABSTRACT

A particular case is matched to further cases, where the matching is based on plural attributes contained in the particular case and in the further cases, wherein one of the plural attributes relates to a flow of activities taken to address the respective case.

18 Claims, 5 Drawing Sheets

(56) References Cited

OTHER PUBLICATIONS

Motahari et al., Analytics for Similarity Matching of IT Cases with Collaboratively-defined Activity Flows, IEEE, Apr. 2011 (6 pages).
Hamid R. Motahari-Nezhad et al., IT Support Conversation Manager: A Conversation-Centered Approach and Tool for IT Incident Management—HP Laboratories—HPL-2010-46, Apr. 2010 (11 pages).
Qihong Shao et al., Efficient Ticket Routing by Resolution Sequence Mining, Aug. 2008 (9 pages).
Miao et al., Generative Models for Ticket Resolution in Expert Networks. Jul. 2010 (10 pages).
Sun et al., Content-Aware Resolution Sequence Mining for Ticket Routing, Sep. 6, 2000 (16 pages).
Yong-Bin Kang et al., Abstract—A knowledge-rich similarity measure for improving IT incident resolution process, Mar. 2010 (1 page).
Mirjam Minor et al., Representation and Structure-based Similarity Assessment for Agile Workflows, 2007 (15 pages).
B. Weber et al., Providing integrated life cycle support in process-aware information systems. World Scientific Publishing Company, Int'l Journal of Cooperative Information Systems (IJCIS), vol. 18, No. 1, 2009, pp. 115-165.
Ruopeng Lu et al., On Managing Business Processes Variants, Feb. 16, 2009 (42 pages).
Madhusudan et al., A case-based reasoning framework for workflow model management, Jan. 25, 2004 (29 pages).
Schonenberg et al., Supporting Flexible Processes Through Recommendations Based on History, 2008 (16 pages).

\* cited by examiner

MATCHING OF CASES BASED ON ATTRIBUTES INCLUDING AN ATTRIBUTE RELATING TO FLOW OF ACTIVITIES

BACKGROUND

An enterprise, such as a business, educational organization, or government agency, typically includes an information technology (IT) infrastructure that has user electronic devices, server computers, storage systems, and/or other types of electronic devices. Incidents can occur in the IT infrastructure, and such incidents are usually addressed by IT management personnel. In a relatively large or complex IT infrastructure, IT incident management can be challenging.

BRIEF DESCRIPTION OF THE DRAWINGS

Some embodiments are described with respect to the following figures.

DETAILED DESCRIPTION

Figure 1:
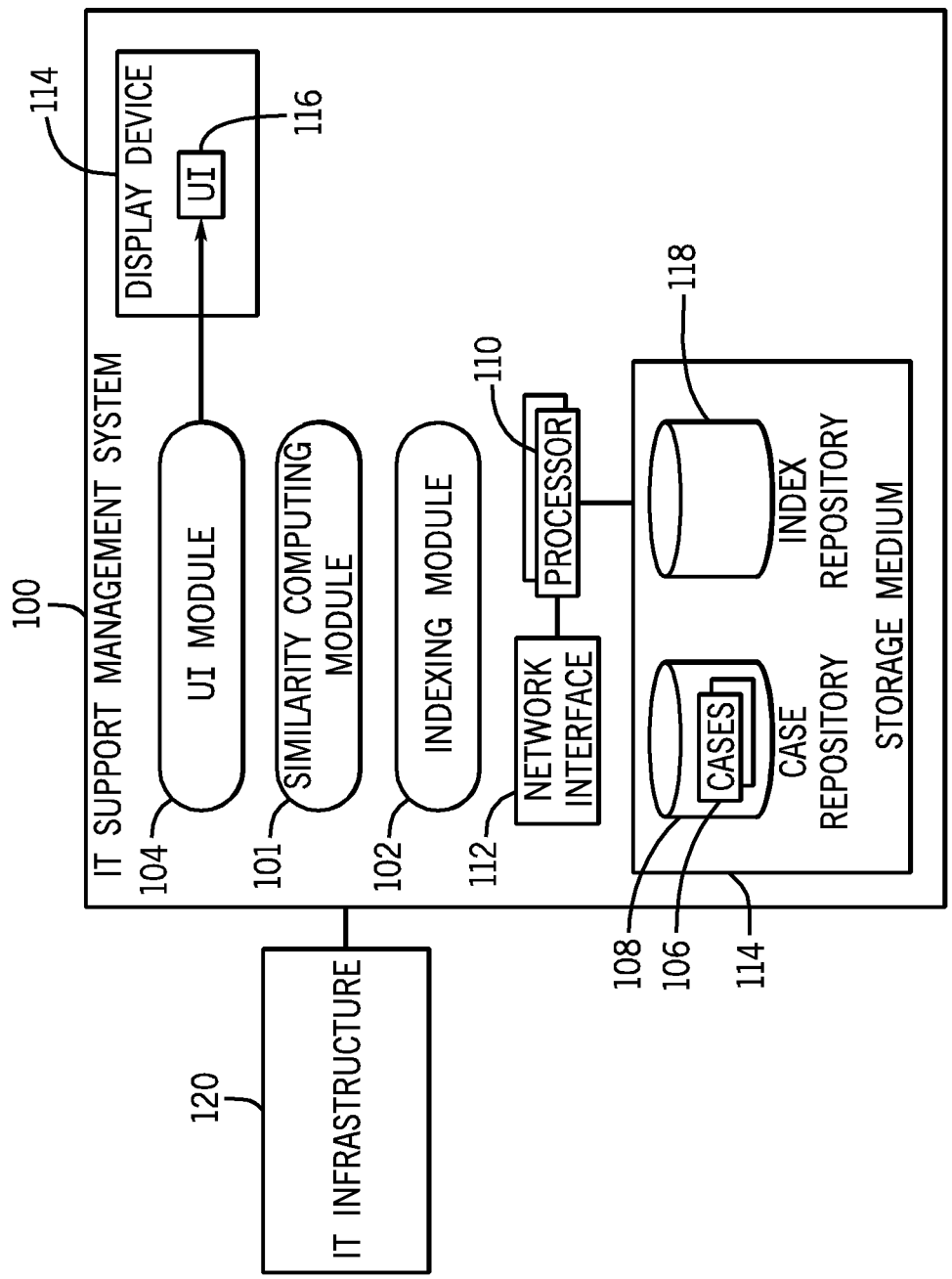
FIG. 1 is a block diagram of an example arrangement that incorporates some implementations.

An information technology (IT) infrastructure includes various devices that cooperate with each other to perform target tasks. Examples of the devices include user electronic devices, server computers, storage systems, communications networks and associated equipment, and so forth. Examples of user electronic devices include desktop computers, notebook computers, tablet computers, personal digital assistants (PDAs), smartphones, and so forth. Examples of server computers include application servers (that provide applications that can be executed by user devices), storage servers (that manage storage systems), database servers (that manage database systems), and so forth. Communications networks can be local area networks (LANs), wide area networks (WANs), wireless networks, and so forth.

In an IT infrastructure, various incidents can occur. For example, a device or a communications network can experience a fault or failure. As other examples, applications or operating systems running on various devices may crash or otherwise not function properly. In a relatively large IT infrastructure, there can be large numbers of types of incidents, and it can be challenging for IT management personnel to address such IT incidents, even with automated IT management tools.

An IT incident can be represented by an IT support case, where an "IT support case" refers to any representation (such as in the form of a record or other type of representation) that contains information regarding the IT incident. Although reference is made to IT support cases in the present discussion, it is noted that techniques or mechanisms according to some implementations can also be applied to other types of cases. More generally, a "case" refers to any representation of an issue that is to be addressed by an enterprise, which can include a business, an educational organization, a government agency, an individual, and so forth.

An IT support management process (for addressing an IT incident) can involve multiple IT personnel and can also involve collaboration among IT personnel. Collaboration can include communications between IT personnel, such as electronic mail conversations, text-based conversations, social networking communications, or other forms of interactions. Collaboration between IT personnel can be recorded for later access.

The ability to apply collaborative techniques to manage IT support cases allows for flexible conversations among participants, including IT support personnel, and possibly end users, to achieve case resolution and to help address the issue of information loss in handoff between collaborating personnel.

To allow for increased efficiency for handling IT support cases, techniques or mechanisms according to some implementations are able to find past IT support cases that are similar to a current IT support case that is being processed by an IT support organization. This ability helps to identify recurring IT support cases so that past resolutions of IT support cases can be leveraged to reuse organizational knowledge. As a result, cost, resources, and time involved in handling IT support cases can be reduced.

The information associated with IT support cases in a collaboration-based IT support management process can include a richer information structure as compared to traditional IT support cases that are not collaboration-based. The "information structure" of a case can include the case's content, format of the content, and other metadata associated with the case. In some examples, an IT support case that is the subject of a collaboration-based IT management process can include a conversation object that contains information due to collaboration among people, such as between IT support personnel or between IT support personnel and an end user or another type of user. In some implementations, an IT support case of a collaboration-based IT management process can include a flow of activities taken to process the respective incident, where the flow of activities includes a collection of steps that can be taken by one or multiple IT personnel. A "step" represents an individual activity in the activity flow. One or multiple steps of the activity flow can be due to collaboration between people.

Finding similar IT support cases that contain richer information structures associated with a collaboration-based IT management process can be challenging. In accordance with some implementations, IT support case matching involves performing matching over multiple attributes associated with respective IT support cases, along with matching based on structured information about cases, where the structured information includes a flow of activities of each respective case to be matched.

As shown in FIG. 1, in accordance with some implementations, an IT support management system 100 contains IT support management components, including a similarity computing module 101 and an indexing module 102. The IT support management system 100 further includes a user interface (UI) module 104 for presenting a user interface 116 (e.g. graphical user interface) in a display device 114.

The similarity module 101, indexing module 102, and UI module 104 are executable on one or multiple processors 110. The IT support management system 100 further includes a network interface 112, which is connected to the processor(s) 110. The network interface 112 allows the IT support management system 100 to communicate with an IT infrastructure 120, which can include various devices as discussed above. Incidents occurring in the IT infrastructure 120 are reported to the IT support management system 100 for processing.

The processor(s) 110 is (are) also connected to a storage medium 114 (or storage media), which can store information, including a case repository 108 and an index repository 118 (discussed further below).

Although the IT support management system 100 is shown as being a single system, it is noted that the IT support management system 100 can actually represent a distributed management system that includes multiple computers (or other types of devices) that are usable by IT support personnel to address IT support cases. The multiple devices can communicate with each other to perform collaboration.

The similarity computing module 101 is configured to identify past IT support cases (106 in the case repository 108 in FIG. 1) that are "similar" to a current IT support case that is being processed. IT support cases are similar to each other if a similarity measure computed based on comparing attributes of the IT support cases has a value that satisfies a predefined criterion (as discussed in further detail below).

A "current IT support case" refers to either a newly received IT support case or a previously received IT support case that is to be processed by an IT support organization. The current IT support case may be partially processed (where certain steps of an activity flow have already been taken).

The similarity computing module 101 computes case similarity based on capturing various attributes of the respective cases. Such attributes can contain textual information, structure information, and other metadata. For example, case similarity take into account similarity between multiple attributes, selected from among:

title of a support case, a case tag (including keywords associated with the case by conversation participants), case resolution of a support case (where the case resolution can be one of resolved, abandoned, or suspended, for example), activity flow information (where an activity flow refers to a sequence of activities performed in previous cases and the partial flow of activities of the current case), step information (where a step refers to an individual activity in a flow), expert information (e.g. profiles of people involved in the case handling conversations, where an expert can be an IT support personnel, for example), case type (a type from multiple predefined types), case priority (priority of a case), and other textual attributes, including participant comment, case description, and customer profile.

The foregoing attributes of an IT support case are provided for purpose of example. In other examples, additional or alternative attributes can be employed.

In some implementations, there are four types of case attributes: categorical, keyword-based, sequence-based, and textual. Examples of categorical attributes are case type, case priority, and case resolution. Case title and tag are examples of keyword-based attributes. Flow information and step information are examples of sequence-based attributes. Examples of textual attributes include case description, case participant comments, customer profiles (profiles of users who submit IT incidents for handling by IT support personnel), and expert profiles (profiles of experts, such as IT support personnel).

Comparison based on categorical case attributes can include matching a first category value (of a first case) with a second category value (of a second case). As examples, the case type of the first case can be compared to the case type of the second case, and the case priority of the first case can be compared with the case priority of the second case, to determine whether the case type or case priority is the same.

In some implementations, to compute similarities for keyword-based attributes such as case titles and tags, common words are extracted into a keyword list, and the keyword list along with a measure of the common words between the cases are used. "Common words" refer to words of the case titles or case tags that are common between multiple IT support cases. A measure of the common words is based on how many words in the case title and/or case tags of the multiple IT support cases being compared are the same.

For comparison of similarities of textual attributes (e.g. case description, case participant comments, customer profiles, expert profiles, etc.), in addition to extracting keywords, semantic associations of specific words are also extracted, and certain words such as names of companies, people, or locations are identified. In IT support cases, names of locations, people, and/or companies can be quite useful for case handling. In some examples, textual similarity can be calculated with a cosine similarity function, a technique for comparing vectors representing word sets. In other examples, other techniques for comparing word sets containing words extracted from respective IT support cases can be used.

In some implementations, for evaluating cosine similarity, word vectors containing significance of various words are considered. Word significance is evaluated as the product of word frequency (number of times that a given word occurs in a case) and word importance. Word importance is a weight chosen to be higher for named entities (such as names of companies, people, locations, etc.) than the weight for other words. This approach allows flexibility in tweaking the weights in relative proportion in order to improve similarity determination performance.

Let $(kw_1, kw_2, \ldots, kw_n)$ be a union of set of words extracted from two text fields a and b (e.g. any of the textual attributes of two respective IT support cases). Let $V_a$ and $V_b$ be two vectors representing the significance of extracted words in the two text fields a and b, respectively. $V_a$ is a vector representing the significance of words extracted from text field a in a first IT support case, and $V_b$ is a vector representing the significance of words extracted from text field b in a second IT support case. If a word is not present in a text field, then the word's significance is set to zero. The cosine similarity between the vectors $V_a$ and $V_b$ is set forth in Eq. 1 below:

$$\text{Cosine Similarity} = (V_a \cdot V_b)/(\|V_a\| \cdot \|V_b\|), \quad \text{(Eq. 1)}$$

where $\|V\|$ represents the magnitude of the respective vector, and $V_a \cdot V_b$ represents the dot product of the two vectors $V_a$ and $V_b$. Eq. 1 produces a similarity score (Cosine Similarity).

In alternative implementations, other techniques for computing similarity between different word sets (for respective different IT support cases) can be used.

Comparison can also be made of sequence-based attributes, including activity flow information and step information. The similarity score for steps are identified based on keywords in the title of each step, for example. A cosine similarity function (as discussed above) or some other similarity function can be used to compare the similarity of the keywords in the step titles of the multiple IT support cases.

To determine similarity between activity flows of respective IT support cases, the similarity computing module 101 can compute the "edit" distance between the sequences steps in the respective activity flows based on an adaptation of the Levenshtein string edit distance measure. This edit distance considers steps that are similar (according to a similarity score being above a threshold) as the same step for the purpose of computing the number of edits (for deriving the edit distance). The underlying model of an activity flow is a directed dependency graph, where the graph has nodes and transitions between nodes. The transitions between nodes represent respective steps of the activity flow. An example graph depicting an activity flow is shown in FIG. 2.

Figure 2:
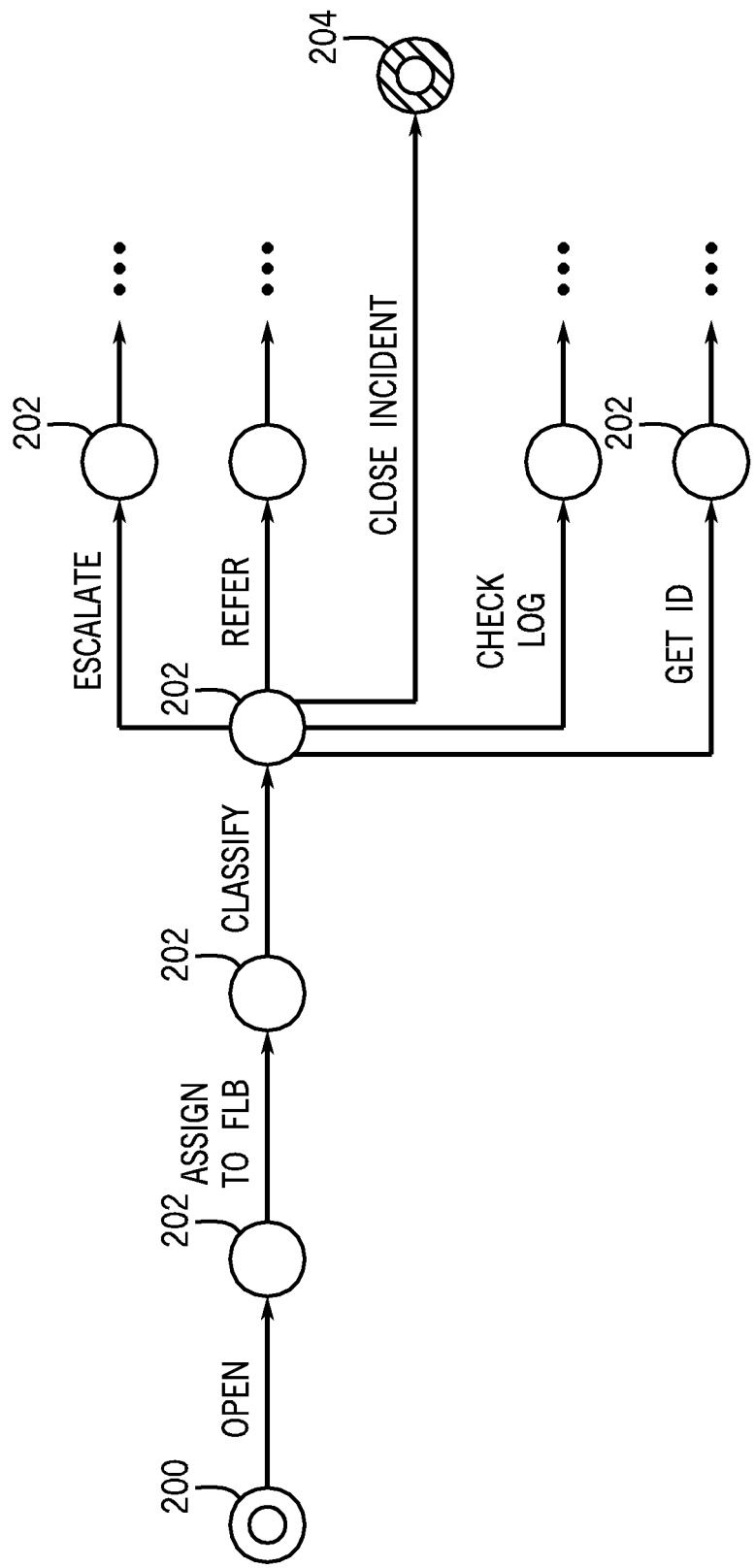
FIG. 2 is a graph of an example activity flow, according to some implementations.

In FIG. 2, the graph representing an activity flow includes a number of nodes (vertices) 200, 202, 204. The graph also includes transitions between the nodes. The node 200 is a starting node, and represents a starting state. The node 204 is an ending node, and represents an ending state. The nodes 202 are intermediate nodes between the starting node 200 and the ending node 204.

Each transition between the nodes of the graph occurs as a result of a respective step taken. Each transition in the flow model is associated with a step name of the respective step. In FIG. 2, example step names associated with respective transitions include the following: "Open" (which represents a step for opening a case), "Assign to FLS" (first level support group) (which represents a step for assigning the case to particular IT support personnel), "Classify" (which represents a step to classify the type of case), "Close incident" (which represents a step to close the case), and so forth.

FIG. 2 is a graph of an example activity flow of a first IT support case. A second IT support case would be represented by another graph, which may have certain similar steps. As noted above, steps in the first and second IT support cases steps that are similar (according to a similarity score being above a threshold) are treated as the same step for the purpose of computing the number of edits for deriving the edit distance.

The edit distance corresponds to the number of changes to make in a first sequence (of a path of steps in an activity flow of a first case) to make the first sequence the same as a second sequence (of a path of steps in an activity flow of a second case). Note that an activity flow (such as that represented in FIG. 2) can have multiple paths of steps. In the example of FIG. 2, a first path can include the following steps: Open, Assign to FLB, Classify, and Escalate. A second path can include the following steps: Open, Assign to FLB, Classify, and Refer.

The changes to be made are of various different edit types, including replace, add, and remove. The edit distance between first and second activity flows (in the first and second IT support cases) can be computed as the weighted average of edit distances between respective different paths in the activity flows, where each weight is proportional to the length of the corresponding paths.

The indexing module 102 of FIG. 1 is configured to create an index for each of the various types of attributes that can be found in the IT support cases 106 stored in the case repository 108. For example, an index can be created for the case tag attribute, another index can be created for the activity flow attribute, another index can be created for a textual attribute (such as participant comments, customer profiles, expert profiles, etc.), and so forth. Each index relates values of a given attribute with the cases within the case repository 108 that contains those values. For example, the index can identify a first subset of cases in the case repository 108 that contain a first value of the given attribute, identify a second subset of cases in the case repository 108 that contains a second value of the given attribute, and so forth.

Maintaining indexes for the different attributes allows for more computationally efficient computation of similarities of cases by the respective attributes. Thus, rather than consider the individual cases 106 in the case repository 108 (by accessing the attributes of the individual cases), the similarity computing module 101 can instead access the indexes that have been built by the indexing module 102. For example, to determine the similarity between cases based on the participant comments attribute, the similarity computing module 101 can access the index maintained for the participant comments attribute.

In some examples, the indexing module 102 indexes categorical attributes using a hashing function. The hashing function is applied to values of a given categorical attribute to produce respective hash values, and the hash values are maintained in the index for the given categorical attribute. Storing hash values instead of the respective values of the given categorical attribute can involve less storage space. Also, matching based on hash values would be computationally more efficient.

For keyword-based and textual attributes, various different text-based indexing mechanisms can be used. In some examples, an indexing mechanism provided from Lucene can be adapted to provide a text-based index for each of the textual attributes. In other examples, other text-based indexing mechanisms can be used.

For indexing of a sequence-based attribute such as the activity flow attribute), a step in the activity flow can be designated as a key—this step is referred to as the "key step." The value stored in the index for the sequence-based attribute is a representation of the steps that follow the key step along with the identifiers of the cases in which the <key-step, next-steps> occurred.

In alternative implementations, indexes built by the indexing module 102 do not have to be employed. In such implementations, the similarity computing module 101 can access attributes of the corresponding IT support cases to identify similar cases to a current IT support case.

Figure 3:
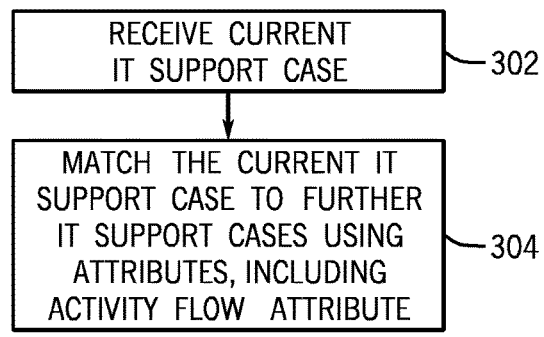
FIG. 3 is a flow diagram of a process of matching information technology (IT) cases, in accordance with some implementations.

FIG. 3 is a flow diagram of a procedure for matching IT support cases, in accordance with some implementations. The procedure can be performed by the similarity computing module 101 of FIG. 1, for example. The procedure receives (at 302) a current IT support case that is associated with an issue that is to be addressed by an enterprise. The procedure then matches (at 304) the current IT support case to further IT support cases that have been processed (e.g. past cases 106 in the case repository 108). The matching is based on multiple attributes contained in the current IT support case and in the further IT support cases, where a given one of the multiple attributes relates to a flow of activities taken to address the respective case.

Figure 4:
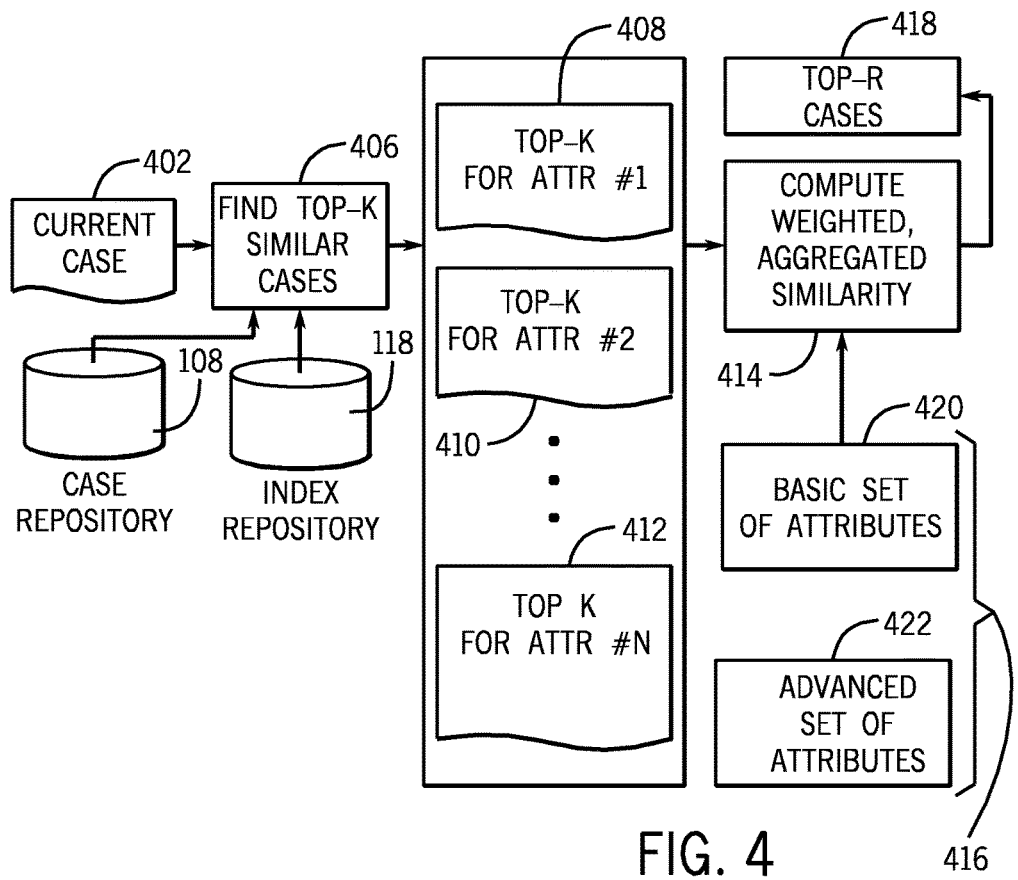
FIGS. 4 and 5 are schematic diagrams of processes of matching IT cases, in accordance with further implementations.

FIG. 4 is a schematic diagram of a procedure according to alternative implementations of finding similar IT support cases to a current IT support case 402. The current IT support case 402 and past IT support cases (within the case repository 108), along with indexes in the index repository 118, are provided as inputs to a task 406 of finding the top-K similar cases (to the current IT support case 402) for each of a set of attributes, where K is an integer that is greater than or equal to 1. The top-K cases for each individual attribute is represented as top-K cases for a first attribute (408), top-K cases for a second attribute (410), and top-K cases for an nth attribute (412), where n is an integer greater than 1.

The top-K cases that are similar to a given attribute are identified by the similarity computing module 101 (in task 406) by using the indexes built by the indexing module 102 (discussed further above).

In addition to finding the top-K cases for each attribute, the similarity computing module 101 also is able to find the top-R cases (that are similar to the current IT support case 402) based on an aggregate of multiple attributes of each of the cases, where R is greater than or equal to 1. The similarity computing module 101 is able to compute (314) a weighted, aggregated similarity score, which considers selected ones of various attributes 316, to produce the top-R cases 318. The computed weighted, aggregated similarity score is based on aggregating (e.g. summing) the individual similarity scores of the respective attributes, where weighted aggregation refers to applying respective weights to the corresponding individual similarity scores and then performing the aggregating (e.g. summing). The attributes considered for computing the weighted, aggregated similarity score can include just a basic set of attributes (320) (from among the attributes 316) to perform a basic mode of determining similarity. Alternatively, additional advanced attributes (322) (from among the attributes 316) can be considered (in addition to the basic set of attributes 320) to perform an advanced mode of determining similarity between cases.

Based on the weighted, aggregated similarity scores that indicate similarities of the past IT support cases (from the case repository 108) to the current IT support case, the top-R past IT support cases can be output (418).

To compute weighted, aggregated similarity scores (418 in FIG. 4), a similarity function can be defined that takes into account individual attribute-based similarity scores, which are weighted using weight coefficients that define the relative importance of each attribute in the similarity function. In some examples, the similarity function is a basic similarity function, which considers just the basic set of attributes 420, for computing a basic similarity score. This basic similarity score is computed as follows:

$$basicCaseSimilarity = \\ titleSimilarity * titleCE + tagsSimilarity * tagsCE + \\ stepsSimilarity * stepsCE + flowSimilarity * flowCE,$$ (Eq. 2)

where titleCE, tagsCE, stepsCE and flowCE are coefficients that specify weights of respective different attributes (case title, case tag, step information, activity flow information). These coefficients sum to 1, for example. The value of each coefficient is set to predefined value initially, and can be tuned through a user feedback to increase the accuracy of the top-R returned results. In Eq. 2, the individual similarity score titleSimilarity represents the similarity between the case title attribute value of a past IT support case and that of a current IT support case; the individual similarity score tagsSimilarity represents the similarity between the case tag attribute value of a past IT support case and that of a current IT support case; the individual similarity score stepsSimilarity represents the similarity between the a step attribute value of a past IT support case and that of a current IT support case; and the individual similarity score flowSimilarity represents the similarity between the flow attribute value of a past IT support case and that of a current IT support case.

For determining advanced similarity that considers the sets 420 and 422 of attributes, the following similarity score is can be used:

$$advancedCaseSimilarity = \\ titleSimilarity * titleCE + tagsSimilarity * tagsCE + \\ stepsSimilarity * stepsCE + flowSimilarity * flowCE + \\ descriptionSimilarity * descriptionCE + \\ commentsSimilarity * commentsCE + \\ customerProfileSimilarity * custProfCE + \\ expertProfileSimilarity * exptProfCE.$$ (Eq. 3)

The sum of all the coefficient values can be 1, for example. In Eq. 3, the individual similarity score descriptionSimilarity represents the similarity between the case description attribute value of a past IT support case and that of a current IT support case; the individual similarity score commentsSimilarity represents the similarity between the case comments attribute value of a past IT support case and that of a current IT support case; the individual similarity score customerProfileSimilarity represents the similarity between the customer profile attribute value of a past IT support case and that of a current IT support case; the individual similarity score expertProfileSimilarity represents the similarity between the expert profile attribute value of a past IT support case and that of a current IT support case.

Although example attributes and their respective scores and weights have been listed in Eqs. 2 and 3 above, it is noted that in alternative implementations, the basic similarity score and advanced similarity score can be based on scores and weights for alternative or additional attributes.

Figure 5:
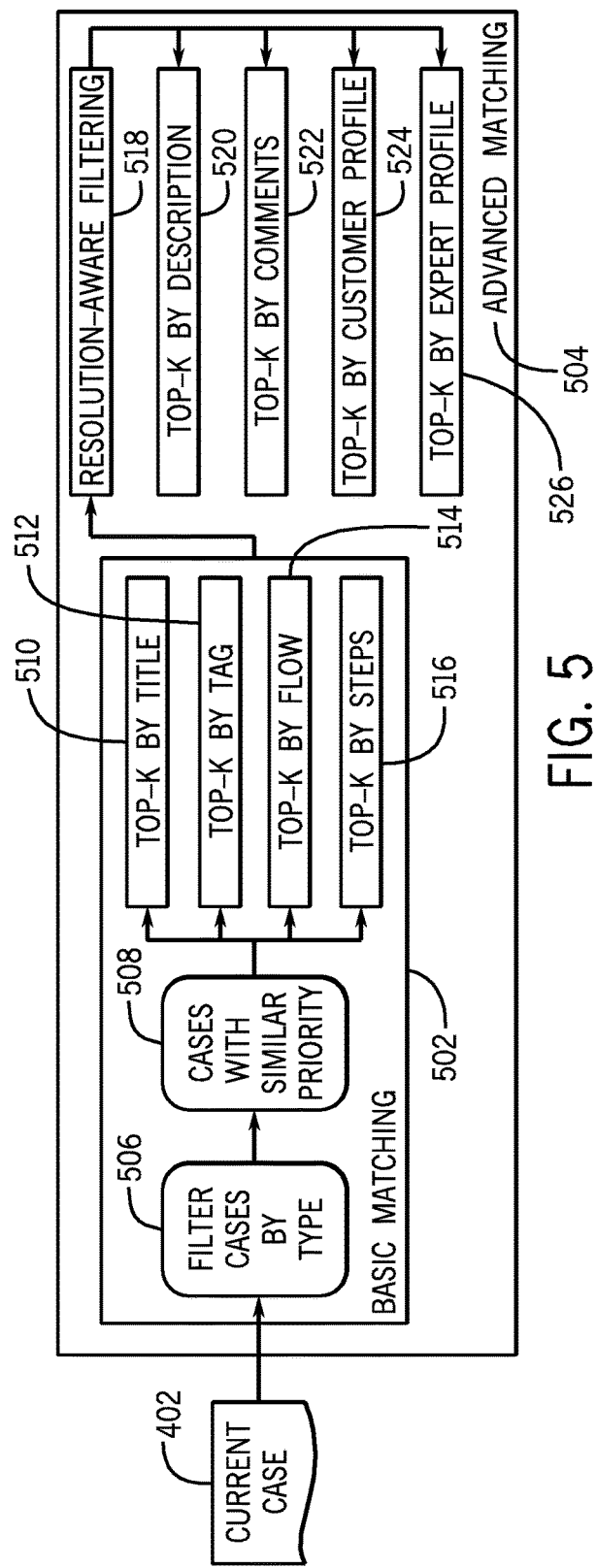

FIG. 5 is a schematic diagram of performing top-K similarity matching, in accordance with further implementations, for individual ones of various attributes in two modes: a basic matching mode 502, and an advanced matching mode 504. In some examples, the similarity computing module 101 in the basic matching mode 502 first filters (506) cases by case type, such that past cases (from the case repository 108 of FIG. 1) of the same type as the current case are selected. Next, the similarity computing module 101 filters (508) cases by priority, where a past case of similar priority can be one that has a priority within some number of priority levels of the current case. For example, the priority level of a case can be in a range between 1 to 5. If the priority level of the current case is 2, for example, then past cases having priorities 1, 2, and 3 are considered (selected) if priority similarity is defined as two cases having at most one priority level difference.

Following the filtering performed at 506 and 508, similarity of the selected past cases (selection after the filtering applied at 506 and 508) to the current case 402 is determined on an individual attribute-by-attribute basis, such as the top-K past cases by title (510), the top-K past cases by case tag (512), the top-K past cases by activity flow (514), and the top-K past cases by steps (516).

In the advanced matching mode 504, the similarity computing module 101 performs top-K similarity determination using additional attributes (in addition to the attributes for the basic matching mode 502). The advanced matching mode 504 can further perform filtering (518) based on the resolution status of each past case. The resolution status of a case refers to whether the case was resolved, abandoned, or suspended. Thus, the output of the basic matching mode can be filtered (518) using the resolution status to provide resolution-aware filtering results. For example, only past cases whose resolution status is "resolved" are selected in the resolution-aware filtering results.

The resolution-aware filtered results can then be used to identify top-K cases based on other attributes, including case description (520), participant comments (522), customer profile (524), and expert profile (526).

The attributes used in the basic matching mode 502 and/or the advanced matching mode 504 are configurable, such as by a user.

To improve the performance in retrieving the top-K matching past cases, certain data can be pre-computed in some implementations, such as similarity between profiles of participants or customers. Also, past cases can be clustered based on their similarity according to the foregoing attributes—the clusters can then be used to enhance the speed at which the basic matching and advanced matching can be performed. For example, a current case can be matched to past cases in one or multiple selected clusters.

Figure 6:
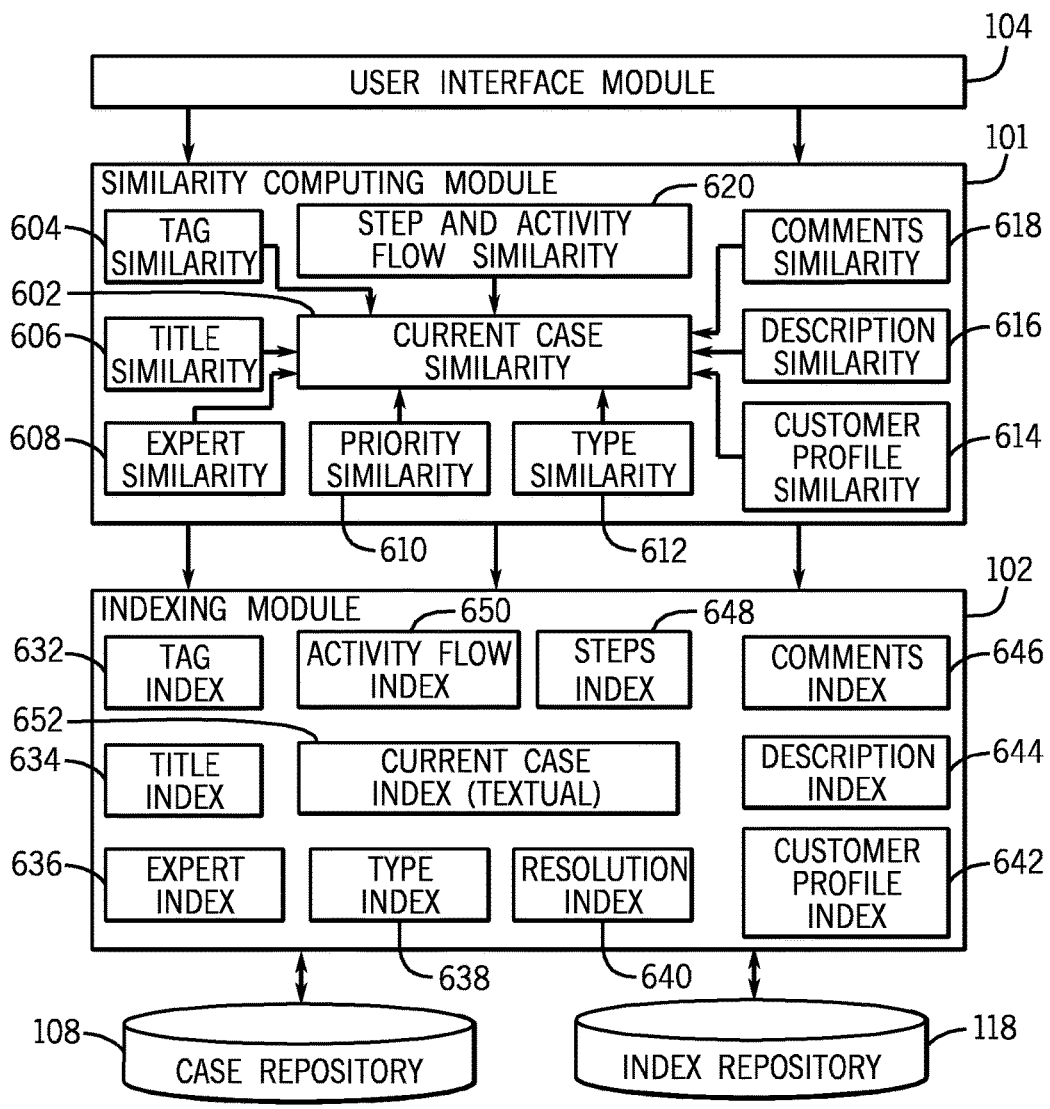
FIG. 6 is a block diagram of components of a similarity computing module and an indexing module, in accordance with some implementations.

FIG. 6 illustrates components of the similarity computing module 101 and the indexing module 102 in greater detail, according to some examples. The similarity computing module 101 determines current case similarity (602) (to identify past cases that are similar to a current case) based on similarities of certain attributes, including, as examples, tag similarity (604), title similarity (506), expert similarity (608), priority similarity (610), type similarity (612), customer profile similarity (614), case description similarity (616), participant comments similarity (618), step and flow similarity (620).

The determination of similarities of individual attributes can be based on indexes computed by the indexing module 102. The indexes include a tag index 632, a title index 634, an expert index 636, a type index 638, a case resolution index 640, a customer profile index 642, a description index 644, a participant comments index 646, a steps index 648, and an activity flow index 650. An index 652 can also be built on the text of the current case.

The various modules discussed above (including the similarity computing module 101, the indexing module 102, and the UI module 104) can be implemented as machine-readable instructions that are loaded for execution on a processor or processors (e.g. 110 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a system having a processor, a particular case that is associated with an issue that is to be addressed by an enterprise;
matching, by the system, the particular case to further cases that have been processed, the matching comprises matching based on plural attributes contained in the particular case and in the further cases, wherein a given one of the plural attributes relates to a flow of activities taken to address the respective case, wherein the matching based on the given attribute that relates to a flow of activities comprises comparing a flow of activities of the particular case with flows of activities of the respective further cases, and wherein the matching comprises computing individual similarity scores for each individual attribute of the plural attributes, where the individual similarity scores of each respective one of the plural attributes indicate similarities of the further cases to the particular case according to the respective attribute; and
building indexes for respective ones of at least some of the plural attributes, wherein the matching uses the indexes.

2. The method of claim 1, wherein the matching based on the plural attributes further comprises matching based on attributes selected from the group consisting of: case tag, case title, expert information, participant comments, customer information, case priority, case description, case type, case resolution information, and steps information.

3. The method of claim 1, wherein the matching based on the plural attributes further comprises matching based on multiple types of attributes selected from the group consisting of a categorical attribute, a keyword-based attribute, a textual attribute, and a sequence-based attribute,
wherein the given attribute that relates to the flow of activities is a sequence-based attribute.

4. The method of claim 1, wherein the matching comprises identifying a predefined number of the further cases that are most similar to the particular case, for each individual one of the plural attributes.

5. The method of claim 1, wherein the matching comprises identifying a predefined number of the further cases that are most similar to the particular case, based on a weighted aggregating of the individual similarity scores computed for each of the plural attributes.

6. The method of claim 5, wherein the weighted aggregating comprises assigning weights to respective ones of the individual similarity scores.

7. The method of claim 1, wherein the matching comprises one of matching in a basic matching mode based on the plural attributes, and matching in an advanced mode that is based on additional attributes in addition to the plural attributes.

8. The method of claim 1, wherein receiving the particular case comprises receiving the particular case associated with a collaboration-based management process, where the particular case contains information due to collaboration among personnel.

9. The method of claim 1, wherein a similarity between the flow of activities of the particular case and the flow of activities of a given one of the further cases is based on similarity of steps in the flow of activities of the particular case and steps in the flow of activities of the given further case.

10. An article comprising at least one non-transitory machine-readable storage medium storing instructions that upon execution cause a system to:
compare attributes of a particular case to attributes of further cases that have been processed, wherein the particular case and further cases relate to at least one issue that is to be addressed by an enterprise, wherein the attributes compared include an attribute relating to a flow of activities taken in the particular case, wherein comparing the attribute relating to the flow of activities taken in the particular case comprises comparing the flow of activities taken in the particular case with flows of activities taken in the respective further cases, wherein the comparing comprises computing similarity scores for each individual one of at least some of the plural attributes, wherein the similarity scores for a given one of the at least some attributes indicate similarities of the further cases to the particular case;
build indexes for respective ones of at least some of the plural attributes, wherein the comparing uses the indexes; and
based on the comparing, match at least one of the further cases to the particular case, wherein the matching is based on the similarity scores, and wherein the matching comprises identifying a predefined number of the further cases that are most similar to the particular case, based on the comparing.

11. The article of claim 10, wherein the matching comprises aggregating, for each of the further cases, similarity scores for respective ones of the at least some attributes.

12. The article of claim 11, wherein the aggregating comprises weighted aggregating in which weights are assigned to respective ones of the similarity scores.

13. The article of claim 10, wherein the plural attributes include multiple types of attributes selected from the group consisting of a categorical attribute, a keyword-based attribute, a textual attribute, and a sequence-based attribute, wherein the attribute relating to the flow of attributes is a sequence-based attribute.

14. The article of claim 10, wherein the comparing comprises comparing steps of the flow of attributes taken in the particular case with steps of each of the flows of activities taken in the respective further cases.

15. A system comprising:
at least one storage medium to store a case repository of cases that relate to at least one issue of an enterprise; and
at least one processor to:
receive a particular case;
match the particular case to the cases in the case repository, the matching based on plural attributes contained in the particular case and in the cases in the case repository, wherein a given one of the plural attributes relates to a flow of activities taken to address the respective case, wherein the matching based on the given attribute that relates to a flow of activities comprises comparing a flow of activities of the particular case with flows of activities of the respective further cases, wherein the matching comprises computing individual similarity scores for each individual attribute of the plural attributes, where the individual similarity scores for each respective one of the plural attributes indicates similarities of the cases in the case repository to the particular case according to the respective attribute; and
build indexes for respective ones of at least some of the plural attributes, wherein the match uses the indexes.

16. The system of claim 15, wherein the comparing comprises comparing steps of the flow of attributes of the particular case with steps of each of the flows of activities of the respective further cases.

17. The system of claim 15, wherein the matching comprises identifying a number of the cases in the case repository that are most similar to the particular case, based on a weighted aggregating of the individual similarity scores computed for each of the plural attributes.

18. The system of claim 17, wherein the weighted aggregating comprises assigning weights to respective ones of the individual similarity scores.

* * * * *